United States Patent
Spirer

(10) Patent No.: US 10,387,002 B2
(45) Date of Patent: Aug. 20, 2019

(54) ADDING INTERACTIVITY TO SLIDE PRESENTATION

(71) Applicant: Dilogr, LLC, Austin, TX (US)

(72) Inventor: Gary Spirer, Austin, TX (US)

(73) Assignee: Dilogr, LLC, Austin, TX (US)

( * ) Notice: Subject to any disclaimer, the term of this patent is extended or adjusted under 35 U.S.C. 154(b) by 440 days.

(21) Appl. No.: 14/581,887

(22) Filed: Dec. 23, 2014

(65) Prior Publication Data

US 2015/0177964 A1    Jun. 25, 2015

Related U.S. Application Data

(60) Provisional application No. 61/920,235, filed on Dec. 23, 2013.

(51) Int. Cl.
*G06F 3/0484* (2013.01)
*G06F 17/22* (2006.01)
*G06F 16/438* (2019.01)

(52) U.S. Cl.
CPC ........ *G06F 3/0484* (2013.01); *G06F 16/4393* (2019.01)

(58) Field of Classification Search
None
See application file for complete search history.

(56) References Cited

U.S. PATENT DOCUMENTS

| | | | |
|---|---|---|---|
| 6,968,506 B2 | 11/2005 | Yacovone et al. | |
| 7,590,939 B2 | 3/2009 | Sareen et al. | |
| 8,407,596 B2 | 3/2013 | Yu et al. | |
| 8,600,220 B2 | 12/2013 | Bloch et al. | |
| 8,682,973 B2 * | 3/2014 | Kikin-Gil | H04L 65/4015 |
| | | | 709/204 |
| 9,082,092 B1 * | 7/2015 | Henry | G06Q 10/06 |
| 2007/0220412 A1 | 9/2007 | Muhlhauser et al. | |
| 2007/0256115 A1 * | 11/2007 | Lee | G11B 27/105 |
| | | | 725/145 |
| 2008/0288341 A1 * | 11/2008 | Garbe | G06Q 30/02 |
| | | | 705/14.64 |
| 2010/0293455 A1 | 11/2010 | Bloch | |
| 2011/0200116 A1 | 8/2011 | Bloch et al. | |
| 2011/0202562 A1 | 8/2011 | Bloch et al. | |
| 2012/0094768 A1 | 4/2012 | McCaddon et al. | |
| 2012/0284774 A1 | 11/2012 | Vaughan et al. | |
| 2013/0226979 A1 | 8/2013 | Caruso et al. | |

(Continued)

FOREIGN PATENT DOCUMENTS

WO    2013/057658 A4    4/2013

OTHER PUBLICATIONS

Susan Harkins, "10 Steps to adding a drop-down menu to a PowerPoint presentation", May 5, 2010, https://www.techrepublic.com/blog/10-things/10-steps-to-adding-a-drop-down-menu-to-a-powerpoint-presentation (Year: 2010).*

*Primary Examiner* — Nhat Huy T Nguyen
(74) *Attorney, Agent, or Firm* — Kunzler Bean & Adamson

(57) ABSTRACT

An apparatus, system, program product, and method are disclosed for adding interactivity to slide presentations. A slide module presents a slide of a presentation. The slide is one of a plurality of slides comprising a slide deck. An overlay module displays one or more interactive elements over the presented slide. An interactive module receives input in response to an interactive element of the one or more interactive elements being interacted with.

18 Claims, 9 Drawing Sheets

(56) References Cited

U.S. PATENT DOCUMENTS

2014/0165087 A1\* 6/2014 Smith ................ H04N 21/4758
725/24
2014/0282013 A1\* 9/2014 Amijee ............ G06F 17/30056
715/732

\* cited by examiner

ADDING INTERACTIVITY TO SLIDE PRESENTATION

CROSS-REFERENCES TO RELATED APPLICATIONS

This application claims the benefit of U.S. Provisional Patent Application No. 61/920,235 entitled "ADDING INTERACTIVITY TO SLIDE PRESENTATIONS" and filed on Dec. 23, 2014, for Gary Spirer, which is incorporated herein by reference.

FIELD

This invention relates to slide presentations and more particularly relates to adding interactive content elements to slides of the slide presentation.

BACKGROUND

Slide presentations are generally used to present information in a succinct and informative manner. Slides may comprise various types of content, such as text, images, graphics, videos, audio tracks, animations, etc. Electronic slide presentations are gaining popularity as a means for disseminating information, and also as a way to market products, services, or the like. However, slide presentations generally only present static content, i.e., content that does not include any interactive elements for a user to interact with.

SUMMARY

An apparatus for adding interactivity to slide presentations is disclosed. A method and program product also perform the functions of the apparatus. In one embodiment, an apparatus includes a slide module that presents a slide of a presentation, the slide being one of a plurality of slides comprising a slide deck. In a further embodiment, the apparatus includes an overlay module that displays one or more interactive elements over the presented slide. In certain embodiments, the apparatus includes an interactive module that receives input in response to an interactive element of the one or more interactive elements being interacted with.

In one embodiment, the apparatus includes a branching module that associates a link to a different slide of the plurality of slides with the interactive element. The different slide may be presented in response to the received input. In a further embodiment, the apparatus includes a trigger module that initiates the presentation of a slide of the slide deck in response to a triggering event. In one embodiment, the triggering event comprises receiving input from an external device, such as a beacon. In some embodiments, the triggering event comprises receiving input using one or more sensors. In various embodiments, the sensors comprise one or more of audio input sensors, proximity sensors, motion sensors, and biological sensors.

The apparatus, in one embodiment, includes an analytics module that collects input data in response to the received input. In one embodiment, the apparatus includes a data module that integrates the collected input data with third-party applications. In some embodiments, the third-party applications comprise one or more information management systems. In some embodiments, the apparatus includes an audio module that plays one or more audio tracks associated with the presented slide. The apparatus, in some embodiments, includes a social module that presents one or more slides of the slide deck on one or more social networks associated with a user.

In some embodiments, the one or more interactive elements comprise questions, hot spots, buttons, and hyperlinks. In certain embodiments, the slide comprises one or more multimedia elements, such as videos, audio tracks, and images. In a further embodiment, the apparatus includes a score module that receives a ranking score for the presented slide. Each slide of the slide deck may be assigned a ranking score based on user input. The apparatus, in certain embodiments, includes a creation module that associates the one or more interactive elements with the slide in response to user input. The overlay module may display on the slide the one or more interactive elements associated with the slide. In one embodiment, the apparatus includes a rewards module that provides a reward to a user in response to the user performing a rewards-based action associated with the slide.

A method, in one embodiment, includes presenting a slide of a slide presentation. The slide, in certain embodiments, is one of a plurality of slides comprising a slide deck. The method, in another embodiment, includes displaying one or more interactive elements over the presented slide. In a further embodiment, the method includes receiving input in response to an interactive element of the one or more interactive elements being interacted with.

In one embodiment, the method includes associating a link to a different slide of the plurality of slides with the interactive element such that the different slide is presented in response to the received input. In a further embodiment, the method includes initiating the presentation of a slide of the slide deck in response to a triggering event. In some embodiments, the triggering event comprises receiving input from an external device, such as a beacon. In some embodiments, the triggering event comprises receiving input using one or more sensors. The sensors, in various embodiments, include one or more of audio input sensors, proximity sensors, motion sensors, and biological sensors.

A program product, in one embodiment, includes a computer readable storage medium that stores code executable by a processor. The executable code, in one embodiment, comprises code to perform presenting a slide of a slide presentation. The slide, in certain embodiments, is one of a plurality of slides comprising a slide deck. The executable code, in a further embodiment, comprises code to perform displaying one or more interactive elements over the presented slide. In certain embodiments, the executable code comprises code to perform receiving input in response to an interactive element of the one or more interactive elements being interacted with.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Figure 1:
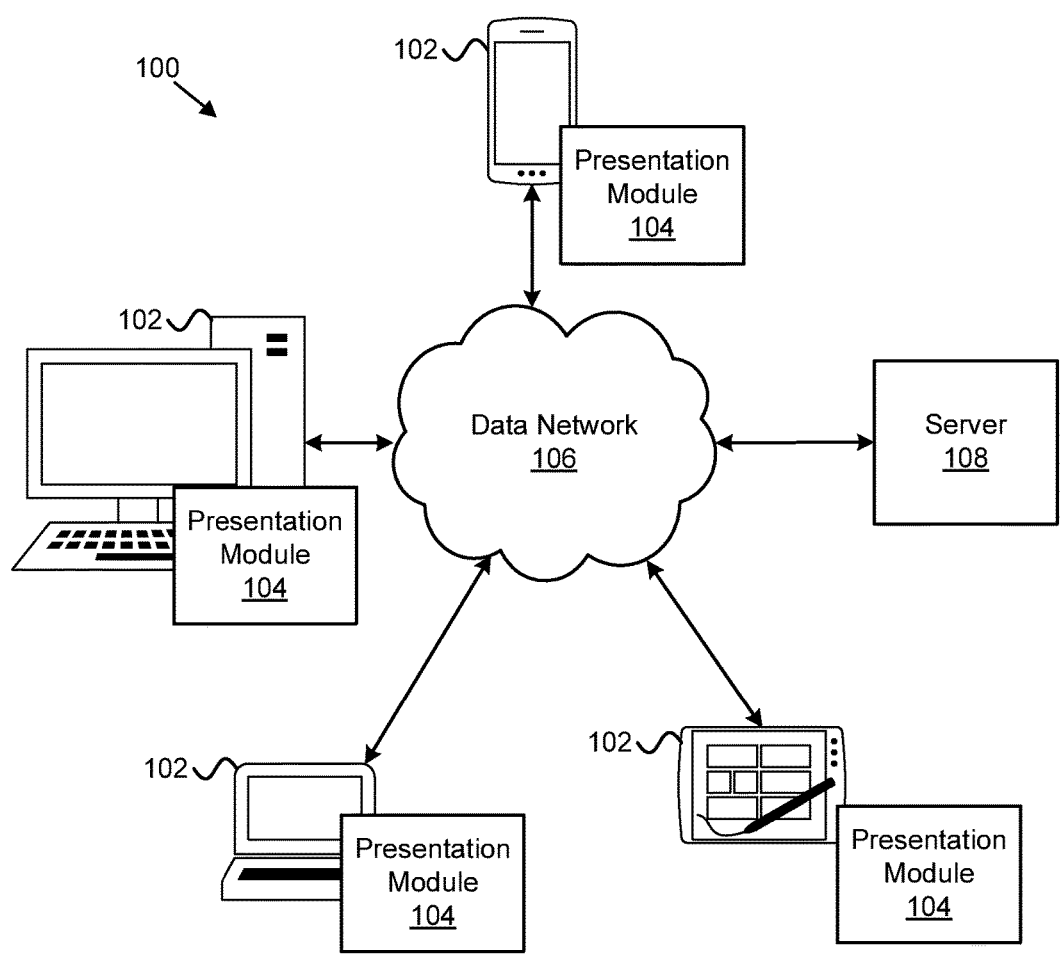
FIG. 1 is a schematic block diagram illustrating one embodiment of a system for adding interactivity to slide presentations.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for digitally displaying and organizing personal multimedia content. In one embodiment, the system 100 includes information handling devices 102, presentation modules 104, networks 106, and servers 108, which are described in more detail below.

In certain embodiments, an information handling device 102 may include an electronic device comprising a processor and memory, such as a desktop computer, a laptop computer, a smart phone, a tablet computer, a smart TV, an eBook reader, and/or the like. In another embodiment, the information handling device 102 may comprise a wearable device such as a smart watch, an optical head-mounted display (e.g., Google Glass®), smart jewelry, and/or the like. In certain embodiments, the information handling devices 102 include touch-sensitive displays such that a user can interact with the touch-enabled device 102 using a stylus, a finger, and/or the like. In another embodiment, the information handling devices 102 are capable of gesture detection in order to detect facial gestures, hand gestures, and/or the like. An information handling device 102, for example, may include gesture detectors, such as digital cameras, infrared cameras, sensors, and/or the like. In certain embodiments, the information handling devices 102 include a physical keyboard, a mouse, a microphone, and/or similar input devices, which allow a user to interact with the information handling devices 102. In certain embodiments, the information handling devices 102 are in communication with each other through the data network.

In one embodiment, the presentation modules 104 present slides to a user, display one or more interactive elements over the presented slides, and receive user input associated with the interactive elements. In another embodiment, at least a portion of the presentation modules 104 are located on an information handling device 102 and/or the server 108. In certain embodiments, the presentation modules 104 include a plurality of modules to perform the operations of the presentation module 104. The presentation module 104, and its associated modules, are described in more detail below with reference to FIGS. 2 and 3.

In certain embodiments, the system 100 includes a data network 106. The data network 106, in one embodiment, is a digital communication network 106 that transmits digital communications related to presenting interactive slides. The digital communication network 106 may include a wireless network, such as a wireless cellular network, a local wireless network, such as a Wi-Fi network, a Bluetooth® network, near-field communication ("NFC"), and the like. The digital communication network 106 may include a wide area network ("WAN"), a storage area network ("SAN"), a local area network ("LAN"), an optical fiber network, the internet, or other digital communication network. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, and/or the like. In certain embodiments, the server 108 includes at least a portion of the presentation module 104. In another embodiment, the information handling devices 102 are communicatively coupled to the server 108 through the data network 106. The server 108, in a further embodiment, stores content associated with presenting interactive slides, such as photos, videos, music, voice recordings, documents, webpages, and/or the like, which are accessed by information handling devices 102 through the network 106. For example, a user using a smart phone, tablet, laptop computer, and/or the like may access interactive slides hosted on the server 108 through the data network 106. In certain embodiments, the information handling device 102 offloads at least a portion of the information processing associated with the presentation module 104, such as content organization, content layout management, data processing, and/or the like, to the server 108.

Figure 2:
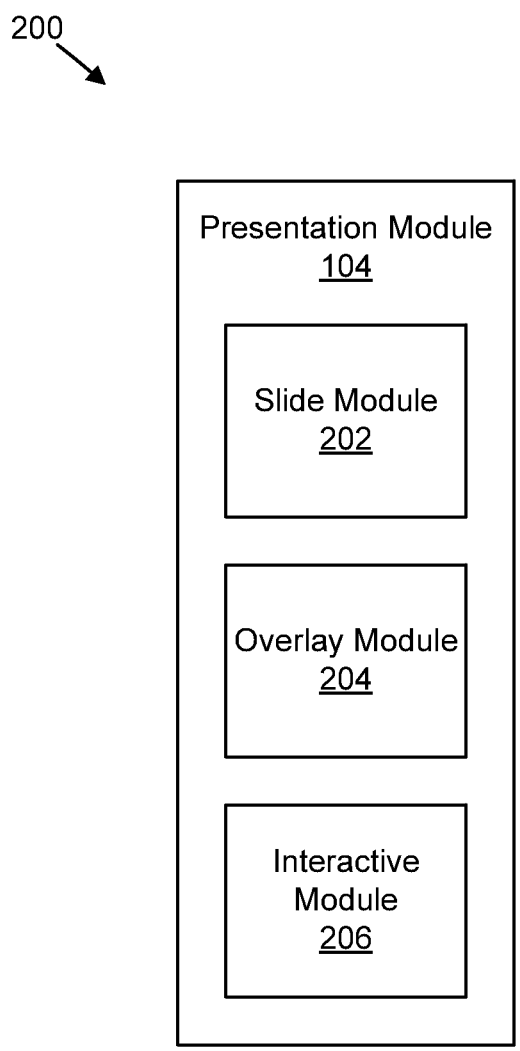
FIG. 2 is a schematic block diagram illustrating one embodiment of a module for adding interactivity to slide presentations.

FIG. 2 illustrates one embodiment of a presentation module 104. In certain embodiments, the presentation module 104 includes a slide module 202, an overlay module 204, and an interactive module 206, which are described in more detail below.

In one embodiment, the slide module 202 is configured to present a slide to a user. In some embodiments, the slide is one of a plurality of slides comprising a slide deck. In one embodiment, a slide deck includes a slideshow presentation created using slide presentation software, such as PowerPoint® by Microsoft®, Keynote® by Apple®, and/or the like. In another embodiment, a slide presented by the slide module 202 may include or may be embodied as an image, such as a digital photograph (e.g., digital image files such as .jpg, .png, .tiff, and/or the like), a document (e.g., document files such as .doc, .pdf, and/or the like), and/or the like. In some embodiments, the slides are static, meaning that there are no interactive elements embedded on the slides. For example, a PowerPoint® slide that is presented by the slide module 202 would simply present images of the slides, even if the slide deck incorporated interactive content before it was uploaded. In some embodiments, the slide module 202 presents content that was associated with the slide deck before it was uploaded, such as animations, videos, images, music, and/or the like.

In certain embodiments, the slide module 202 presents slides to a user on a display of an electronic device, such as an information handling device 102, using any type of slide player configured to present interactive slides. For example, the slide module 202 may present the slides to a user using a smart phone or tablet computer. In some embodiments, the slide module 202 makes the slides accessible to an application running on the information handling device 102, such as a web browser, a slide viewing application, and/or the like. In certain embodiments, the slide module 202 presents slides stored on the server 108, which may be accessible by a user over the data network 106. For example, the slide module 202 may present slides over the data network 106 to a user using a web browser to view the slides.

In one embodiment, the overlay module 204 is configured to display one or more interactive elements over the slides presented by the slide module 202. Interactive elements may include multimedia content, such as videos, images, audio tracks, and/or the like. In another embodiment, the interactive elements may include graphical user interface ("GUI") features, such as buttons, hot spots (i.e., special, interactive areas on the display, which may be visible or hidden), hyperlinks, pop-ups, tool tips, chat/instant message portals, and/or the like. In some embodiments, the interactive elements include interactive questions, such as quizzes (e.g., personality quizzes, persona quizzes, scored quizzes, outcome quizzes, etc.), surveys, polls, and/or the like. In some embodiments, the interactive elements comprise advertisements, sponsor links, coupons, promotions, or the like. In yet another embodiment, the interactive elements may include webpages. For example, a slide that includes an advertisement for a product may include an interactive hyperlink that, when clicked, opens a webpage associated with the product within the slide viewing area such that the user may view and/or buy the product from within the slideshow. As described in more detail below, interactive slide decks may be created for various contexts, such as advertising, marketing, e-commerce, education, training, certifications, clinical trials, testing, and/or the like by utilizing interactive question and answer elements, such as surveys, quizzes, polls, assessments, or the like.

In some embodiments, the overlay module 204 positions the interactive elements over certain areas of the slide in response to user input. For example, a user who is creating an interactive slide may position buttons, links, videos, and/or the like in certain positions on a particular slide. In another embodiment, the overlay module 204 detects areas of a slide, such as shapes, shaded regions, text, hyperlinks, and/or the like, and positions interactive elements over those areas of the slide. For example, the overlay module 204 may detect a hyperlink on the slide and position an interactive element over that area of the slide such that a user may click on the hyperlink as if he is clicking on the underlying text. In some embodiments, the overlay module 204 performs image processing to detect areas of a slide to position an interactive element over.

In certain embodiments, the overlay module 204 creates a template representing the types of interactive elements and the layout of the interactive elements used for a particular slide, which may be stored and retrieved at a future time and applied to a different slide. This may be useful, for example, if there are many slides, or slide decks, that are substantially similar such that a person creating the interactive slide does not have to redesign a previously designed layout of interactive elements.

An interactive module 206, in one embodiment, receives user input associated with an interactive element displayed by the overlay module 206 on a slide. The interactive module 206, in some embodiments, receives user input from an input device, such as a keyboard, mouse, stylus, touch (i.e., a finger on a touch-enabled device), and/or the like. In another embodiment, the interactive module 206 receives input from a gesture, such as a facial gesture, hand gesture, and/or the like. For example, a user may interact with a hyperlink presented on a slide by hovering a finger over the hyperlink displayed on an information handling device 102 capable of gesture detection. One of skill in the art will recognize other ways to interact with an information handling device 102.

In one embodiment, the overlay module 204 associates the interactive elements with a task, action, activity, and/or the like, which is performed in response to the interactive module 206 receiving user input. For example, when a user clicks a button, a pop-up may be displayed by the overlay module 204, which may include a survey with a plurality of questions and response choices. Alternatively, a video may be presented and played when a user interacts with a hotspot presented by the overlay module 204 on a slide. Other tasks may include displaying a new slide, playing a video, displaying a website, playing an audio track, prompting a user for information, presenting an e-commerce website, and/or the like. In certain embodiments, the interactive module 206 prevents the user from navigating to a new slide until a particular interactive element has been interacted with. For example, a slide may include a poll question that requires the user to provide a response before the user is allowed to move on to the next slide. In another embodiment, the slides dynamically move to another slide without user input received by the interactive module 206. For example, a title slide may not contain any interactive elements and may automatically move to the first substantive slide after a predetermined time period, or the like.

In certain embodiments, the interactive slides are stored on a server 108 and are accessible by one or more persons, information handling devices 102, systems, and/or the like, through the data network 106. In one embodiment, when an interactive slide deck is modified (e.g., when a new slide is added, a new interactive element is added, and/or the like), the modification is propagated through to devices accessing the modified slide deck through the network 106. In this manner, changes may be made and easily delivered to users viewing and using the interactive slide deck. In another embodiment, an interactive slide deck is searchable.

In some embodiments, an interactive slide deck is optimized for search engine optimization ("SEO") such that a slide deck may be found using a keyword search in a search engine. For example, the overlay module 204 may define the interactive elements to be sources for keyword searches using a search engine. In some embodiments, the interactive elements are a source of a keyword search in response to a user using a paid search, an unpaid search, a social network search, a database search, and/or the like. In certain embodiments, a user may define the search criteria associated with the interactive elements when creating the interactive slide deck. For example, a user may define one or more tags associated with an interactive element, which may become sources of a keyword search by the overlay module 204.

Figure 3:
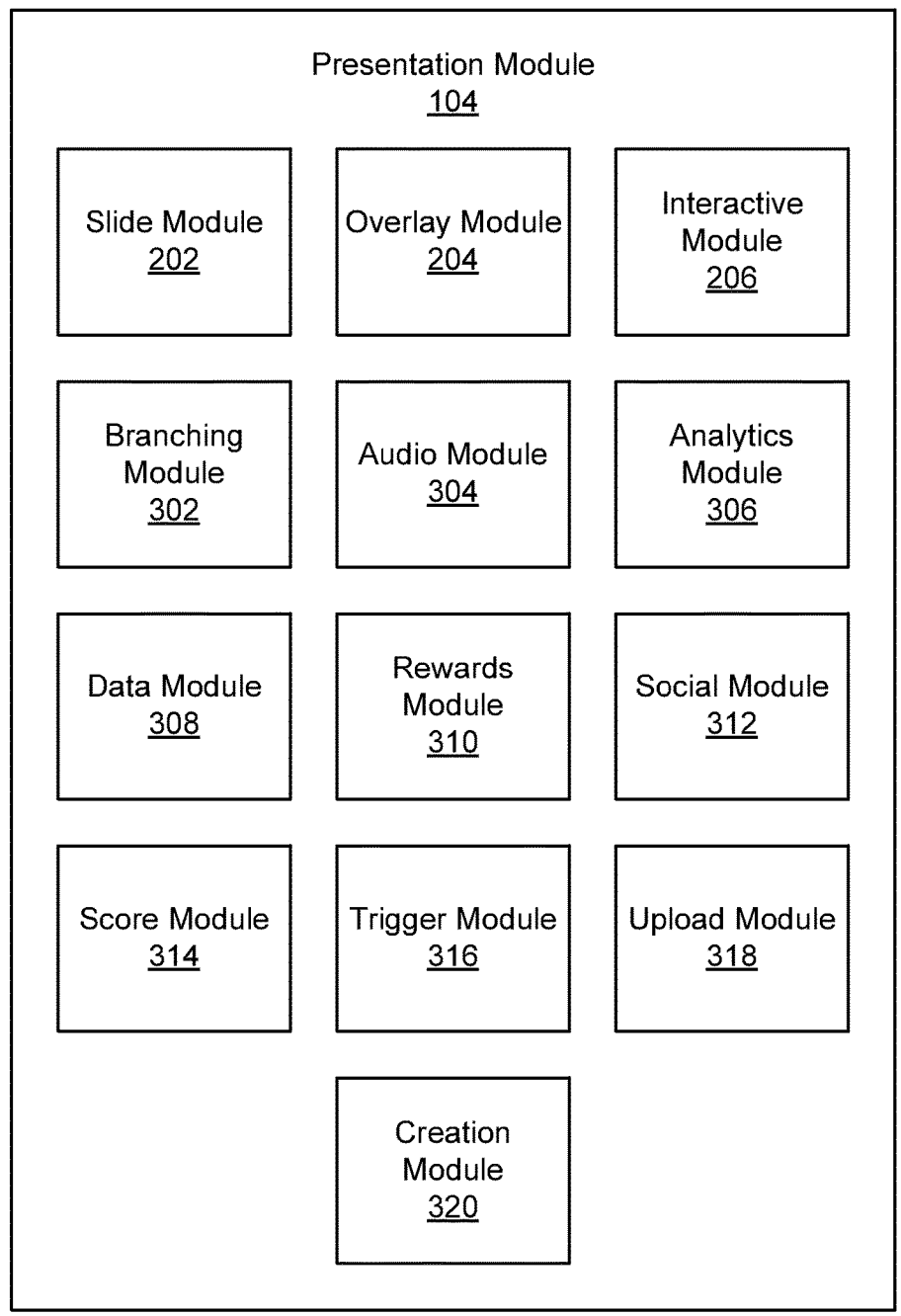
FIG. 3 is a schematic block diagram illustrating one embodiment of another module for adding interactivity to slide presentations.

FIG. 3 illustrates another embodiment of a presentation module 104. In certain embodiments, the presentation module 104 includes a slide module 202, an overlay module 204, and an interactive module 206, which are substantially similar to the slide module 202, overlay module 204, and interactive module 206 described with reference to FIG. 2. In a further embodiment, the presentation module 104 includes a branching module 302, an audio module 304, an analytics module 306, a data module 308, a rewards module 310, a social module 312, a score module 314, a trigger module 316, an upload module 318, and a creation module 320, which are described in more detail below.

The branching module 302, in certain embodiments, creates a link from the presented slide to one or more different slides. In one embodiment, the branching module 302 displays a new slide when an interactive element is interacted with by a user. The new slide may be associated with the interactive element. For example, a button overlaying the slide may be associated with a new slide such that when the button is clicked the new slide is displayed by the branching module 302. Alternatively, the branching module 302 may notify the slide module 202 that a particular slide is to be presented.

In this manner, a slide deck comprising a collection of individual slides may be navigated in any predetermined order based on how the user interacts with a particular slide, instead of being forced to navigate a slide deck in a linear or sequential manner. For example, a survey question presented to a user may include answer choices that each link to a new slide. Thus, depending on which answer the user selects determines which slide is displayed next by the slide module 202. The branching module 302, in one embodiment, receives the user's response and determines which slide, if any, is associated with the response and notifies the slide module 202 to display the associated slide. The branching module 302 may link an interactive element to any of the slides in the slide deck regardless the order of the slides in the slide deck. Thus, the branching module 202 may link to a previously presented slide, a slide that is ten slides ahead or behind, and or the like.

The audio module 304, in certain embodiments, associates audio tracks with the presented slide. In certain embodiments, the audio tracks include voice recordings, music, sound effects, and/or the like. For example, an interactive element may include a survey question that is read-aloud to the user by the information handling device 102. The audio module 304, in another embodiment, receives a voice response from a user. Thus, the user could answer a question by speaking the answer into a microphone on the information handling device 102. Alternatively, the audio module 304 receives voice commands from the user, such as commands to go to the next slide, to select a particular interactive element, and/or the like. In certain embodiments, the audio module 304 plays an audio track associated with a presented slide automatically, such as when the slide first becomes visible. In another embodiment, the audio module 304 plays an audio track in response to user input, such as when an interactive element is interacted with, when a media player is selected for playback, and/or the like.

In one embodiment, the analytics module 306 collects user input data in response to the user input detected by the interactive module 206. For example, the analytics module 306 may collect data in response to how a user interacts with an interactive element displayed by the overlay module 204, such as how a user answers a particular survey question, quiz question, poll question, and/or the like. In some embodiments, the analytics module may track and collect web data associated with users, such as IP addresses, location data, and/or the like. In another embodiment, the analytics module 306 may monitor a media player presented by the overlay module 204 and collect data associated with a user's interaction with the media player, such as when the user stopped watching, how long the user watched before stopping the player or leaving the slide, how many times the video was played from beginning to end, and/or the like. The analytics module 306 may track this data for all users who view the slides and generate descriptive metrics, which may be helpful in generating targeted advertising, marketing campaigns, customized slide decks, and/or the like.

The analytics module 306 may also collect aggregate data, such as the total number of users who have viewed the slides, the average amount of time spent on a slide by all users, and/or the like. In another embodiment, the analytics module 306 cross-compares the data collected from a slide deck viewed on different information handling devices 102, such as data received from users who viewed the slide deck on a smart phone, a laptop computer, and a desktop computer. In another example, the analytics module 306 may cross-compare data collected from an interactive slide deck that is part of an advertising campaign with data collected from other marketing channels of the same marketing campaign in order to determine the effectiveness of the marketing channels. For example, the analytics module 306 may compare the number of leads generated from an interactive slide deck viewed on a mobile device versus the number of leads generated from a banner-ad viewed on a mobile device.

In some embodiments, the analytics module 306 tracks a position of a cursor as the user moves the cursor around the slide in order to determine the areas of the slide that the user is interested in. Similarly, in embodiments where the information handling device 102 tracks gestures, the analytics module 306 tracks a user's eye movements to determine which areas of a slide hold the user's attention and which areas may not be as interesting to the user.

In certain embodiments, the analytics module 306 provides real-time analytics based on the collected data, such as evaluations, recommendations, reports, and the like, in response to the user's interaction with the one or more interactive elements. In some embodiments, the analytics module 306 provides analytics to one or more third-party applications, described below, in real-time, according to a predetermined schedule, and/or the like. Various statistical analyses may be performed on the data including cross tabulations, optimization analyses, pattern analyses, tracking analyses, business intelligence analyses, and/or the like. In certain embodiments, where the one or more interactive elements include questions, the analysis performed by the analytics module 306 may be performed on a per question basis and/or for an entire question set associated with a slide deck.

In another embodiment, the analytics module 306 provides a dashboard interface summarizing the collected data and analyses performed on the data. The interface may include pie charts, bar charts, line graphs, matrixes, tables, and the like that graphically depict metrics and/or statistics generated by the analytics module 306. In some embodiments, the analytics module 306 customizes the data that is viewed and how it is viewed based on user input. For example, a user may define their own data metrics, charts, graphs, data sources, and/or the like. In one embodiment, the analytics module 306 may include an export function that exports the collected metrics, or a subset of the collected metrics, to different file formats, such as a comma-separated values file ("CSV"), a portable document format file ("PDF"), and the like, to be used by other applications, such as a spreadsheet program, a statistical package program, and the like. One of skill in the art will recognize various file formats which may be used for exporting data.

In another embodiment, the analytics module 306 comprises artificial intelligence learning capabilities. In one embodiment, the analytics module 306 learns by analyzing users' responses to interactive elements. The analytics module 306 may then intelligently respond to the user with additional personalized interactive content, such as targeted surveys, quizzes, polls, assessments, games, product suggestions, and/or the like. Further, based on an analysis of the provided responses, personalized rewards, incentives, offers, promotions, and/or the like, may be presented to a user in response to the user completing a survey, quiz, poll, and/or the like. In one embodiment, the analytics module 306 continually refines and adjusts the content of the responses provided to a user based on the user's responses to the interactive elements.

In one embodiment, the data module 308 integrates the data collected and processed by the analytics module 306 with third-party software applications. The data module 308, for example, may integrate with various information management systems, such as customer relationship management ("CRM") systems, business intelligence systems, e-commerce systems, content management systems ("CMS"), and/or the like via various application programing interfaces ("API"s). In another embodiment, the data module 308 tags, filters, and/or segments, in real-time, collected data that may be pushed to external systems. For example, an external CRM system may have an automated marketing response function that will automatically send a text message, email, and/or the like based on tags. Tags, in certain embodiments, comprise a customizable keyword or term associated with a piece of information. The data module 308 may integrate the CRM system with the presented slide deck such that data collected from the user's responses to the interactive elements is sent to the CRM system in real-time with associated tags. The CRM system, upon receiving the tagged data, may trigger one or more automated marketing responses.

In one embodiment, a rewards module 310 provides a reward to a user in response to the user performing a rewards-based action. The rewards may include loyalty points, incentives, discounts, coupons, badges, achievements, bargains, promotions, offers, sweepstakes, gift certificates, paid-for deals/rewards/coupons/etc., and/or the like, in response to a user's participation in an interactive survey, poll, quiz, game, assessment, and/or the like presented by the overlay module 204. The rewards module 310, in one embodiment, customizes the rewards offered in response to a user's interaction with the interactive elements. For example, in one embodiment, a slide may include an interactive video that includes survey questions regarding the products in the video. As a user answers the questions, the analytics module 306 may use the user's responses as a reference to find products in a product database in order to create customized product recommendations in real-time for the user. In other embodiments, the rewards module 310 provides rewards for a user's participation in rewards-based actions, such as providing an email address, sharing slides, providing referrals, donating money, reviewing products, and/or the like.

In one embodiment, a social module 312 provides the one or more slides to persons associated with a user. In certain embodiments, the social module 312 provides the slides on a social network to one or more persons associated with the user. For example, the social module 312 may share the slides with a user's Facebook® friends, Twitter® followers, or the like. In some embodiments, the social module 312 shares the slides based user input. For example, the user may select which social networking sites to share the slides on, who to share the slides with (e.g., which friends to share with), how to share the slides (e.g., a link in an email, text message, wall post, tweet, instant message, and/or the like) and/or the like.

In certain embodiments, the social module 312 may share the slides as an "embedded experience." "Embedded experiences," as used herein, are means to embed the services provided by a third party into a container on a social network website. For example, a user may post slides on their Twitter feed. Twitter may post a tweet about the slides to the user's Twitter account. The tweet may contain an "embedded experience" where the user's Twitter followers may view the slides from within Twitter without having to go to the website hosting the slides to view the slides. Further, an "embedded experience" may allow a user to perform other actions, such as sharing content, reviewing content, posting comments, or the like. The service providing the "embedded experience" may specify which features to make available to a user.

In another embodiment, the social module 312 shares an interactive slide deck on a crowd sourcing service, such as kickstarter.com, 99designs.com, and/or the like. For example, a user may create a slide deck highlighting their products, goods, services, and/or the like to be evaluated by others. The slide deck may illustrate a series of products, each depicted on separate slides with an accompanying interactive element requesting a user's opinions, reviews, comments, and/or the like, regarding the displayed product. The user, in order to view the remaining slides in the slide deck, may be required to provide input in response to the interactive elements. The social module 312, in some embodiments, provides the slides to various presentation-related cloud hosting sites such as Slideshare®, Prezi®, or the like, which may or may not be membership- or subscription-based. In certain embodiments, the social module 312 may use an API to interface with various presentation-related cloud hosting sites.

In one embodiment, the social module 312 distributes the interactive slide deck to advertising affiliates and/or other third party platforms. For example, an affiliate may embed the interactive slide deck distributed by the social module 312 on their website. When slides are interacted with by different users, the affiliate may gain an affiliate commission and/or credit. In one embodiment, the embedded code used to display the slide deck may include the affiliate's identifier and/or an affiliate code in order to trace any interactivity with the slide deck to the affiliate. The affiliate, in certain embodiments, may receive credits, commissions, or the like, in response to users interacting with the slide deck on the affiliate's site, making a purchase associated with the slide deck, interacting with the interactive elements, and/or the like. In this manner, the content creator is able to gain real-time feedback in response to a user interacting with the interactive elements than traditional advertising methods, such as banner-ads and email campaigns.

In one embodiment, a score module 314 receives a ranking score for the presented slide. In some embodiments, the score module 314 assigns a ranking score to each slide within a slide deck. The score module 314, in another embodiment, orders the slides of a slide deck based on the received ranking scores. For example, the slide module 202 may present a slideshow of photos of a user's wedding uploaded by a user. As the slides are viewed by the user, friends of the user, or other people, the score module 314 may receive a ranking score for a slide. Thus, as a friend of the user, for example, is going through the photos of the user's wedding, the friend can rank the photos on a numerical scale. The user may then determine which photos are the most popular based on the ranking scores received from others. In this manner, the user may determine which photos are the best, based on other's input. Such an embodiment may be expanded to help the user make other decisions, such as what outfits to wear by presenting slides of clothes, what fixtures to put in a home by presenting slides of various fixtures, and/or the like. In some embodiments, the score module 314 automatically determines a ranking score for a slide based on the amount of time a user spends on the slide, the total number of views the slide receives, or the like.

In a real estate example, a real estate agent may create an interactive slide deck that includes a variety of images from different homes. The slides may include interactive elements such as informative pop-ups regarding the homes in the images, survey questions to assess the buyer's interest in different features of the homes, and/or the like. The real estate agent may send the interactive slideshow to the buyer, for example, by email, text, social media (e.g., posting the slideshow to the buyer's Facebook page), and/or the like. In one embodiment, the score module 314 receives a ranking score for each slide from the buyer, which the real estate agent can use to determine the best homes to show the buyer according to the buyer's interests. Similarly, a home builder could send a slideshow of images comprising different layouts, architectures, fixtures, and/or the like, to gauge the buyer's interests.

In a further example, the interactive slide deck may communicate with a multiple listing service ("MLS") to receive slides based on input received from a user associated with existing slides. For example, the upload module 318, described below, may communicate with the MLS through the data network 106 to dynamically create new slides based on a user responses to interactive elements on existing slides. Thus, in response to a user providing high scores for certain features of a home, such as granite countertops in the kitchen, hardwood floors, and/or the like, the score module 314 queries the MLS database for homes with the highly-scored features, which the upload module 318 receives and presents to the user as a new slide deck or as new slides in the existing deck. In some embodiments, a template of interactive elements created by the overlay module 204 is displayed on the dynamically-created slides. In such an embodiment, the person associated with the MLS listing may receive an affiliate credit, a finder's fee, and/or the like. The same concept may be utilized in other industries, such as lending, investing, crowd funding, hedge funds, credit bureaus, insurance, and/or the like.

In another example, a user may create a "wishlist" of slides, where the user downloads images from the Internet and puts them into a "wishlist-"style slideshow. The "wishlist"-style slideshow may represent the interests of the user, such as hobbies, games, sports, work, school, travel, and/or the like. The "wishlist" may comprise slides of images representing things that the user is interested in, experiences the user has had, and experiences that the user wishes to have. The user may add interactive elements, such as audio messages (e.g., the user may narrate the back-story behind an image, or the like), informative pop-ups, videos, and questions to determine others' interests, comments, and feedback. The score module 314 may receive rankings from other users, which the "wishlist" creator may use to help make decisions regarding their "wishlist." In some embodiments, users may provide feedback, reviews, evaluations, and/or the like related to the "wishlist." "Wishlists" may also be used in other contexts, such as sales, investor relations, consumer relations, and/or the like.

In one embodiment, the score module 314 receives scores associated with slides of a slide deck comprising a quiz, where each slide represents a quiz question. The overlay module 204, in one embodiment, positions a question and/or multiple answers on a slide, which the user interacts with to provide a response to a quiz question. Based on the user's responses, the slide may receive a score. For example, a correct answer may be worth 100 points and an incorrect answer may receive 0 points, or the like. In some embodiments, different slides have different point values. Thus, a slide with an easy question may only be worth 5 points, whereas a slide with a more difficult question may be worth 50 points, assuming the user answers the quiz question correctly. In some embodiments, at the end of the slideshow, i.e., at the end of the quiz, the user is provided with their quiz score calculated by the score module 314, along with recommendations, tips, comments, feedback, and/or the like, based on their performance.

In a similar embodiment, the slideshow may comprise a personality quiz, where each slide comprises a personality-related quiz question. In such an embodiment, each interactive answer choice presented by the overlay module 314 is associated with a particular personality type. At the end of the slideshow, i.e., at the end of the personality quiz, the score module 314 calculates a personality score based on the user's responses and provides a personality recommendation for the user. For example, at the end of the quiz, the score module 314 may determine that the user is more like "chocolate" and not "strawberry," or the like. The score module 314 may also present recommendations and feedback associated with the user's personality type. In some embodiments, the recommendations may be presented using interactive content elements, such as hotspots that include links to external content, videos, images, webpages, or the like.

In one embodiment, a user's quiz results from a scored quiz, a personality quiz, or the like, may be shared with others by the social module 312. For example, the user's personality quiz result may be posted to the user's Twitter® feed, or the like, along with a link to the personality quiz. Thus, the tweet may state "Hey, I just took this awesome personality quiz and I got 'Chocolate.' What do you think your personality is? Click here to take the quiz." Alternatively, the user may post his results from a scored quiz on his Facebook® wall, along with a link to the quiz, in order to compete and compare results with his Facebook® friends.

In another example, a hotel may advertise rooms and receive reservations through an interactive slide deck. For example, an interactive slide deck may include images of different rooms in the hotel, with each slide representing a room. The user may reserve a room by selecting the slide that includes the room they are interested in and filling out a form, which may be an interactive element on the slide. Further, the slide deck, in response to the user reserving the room, may branch to a different set of slides associated with car rentals, restaurant information, tourist information, and/or the like.

A trigger module 316, in one embodiment, activates the presentation of the slides by the slide module 202 on the information handling device 102. In certain embodiments, the trigger module 316 presents the slides in response to internal and/or external cues. For example, the trigger module 316 may activate presentation of the slides in response to motions, gestures, finger prints, eye movements, hand movements, accelerometer movements, gyroscopic movements, color vision, proximity sensors, binocular vision, acoustics, voice commands, images, body sensors, biological sensors, health sensors, eye movements, head movements, or the like. Other triggers may include receiving emails, texts, reading QR codes, receiving an NFC communication, being physically within a predefined proximity of a GPS coordinate, scanning bar codes, and/or the like. In one embodiment, the trigger module 316 activates presentation of a slide deck in response to the user drawing with a stylus on a touch-enabled device. For example, the trigger module may recognize an image drawn by the user, such as a square, circle, dot, and/or the like, as an activation trigger. In some embodiments, the trigger module 316 may present slides or slide decks based on a user's responses to quizzes, surveys, polls, etc.

In some embodiments, the trigger module 316 is in communication with one or more sensors, beacons, or the like such that the trigger module 316 sends one or more messages, signals, notifications, or the like to one or more sensors in response to a user interacting with one or more interactive elements. For example, the trigger module 316 may send a signal to a sensor associated with a printer that notifies the printer to print a coupon, receipt, offer, or the like in response to the user interacting with an interactive advertisement on a slide. In some embodiments, the trigger module 316 sends a signal to a sensor in real-time. In certain embodiments, the trigger module 316 sends a delayed signal to a sensor in response to user interaction. Continuing with the previous example, the trigger module 316 may not send a signal to print the coupon until the trigger module 316 is within a predefined proximity of the sensor.

In various embodiments, the trigger module 316 activates presentation of the slides in response to a mobile device, an optical head mounted display unit, e.g., Google Glass®, or the like, recognizing, communicating with, or otherwise interpreting sensors or information at kiosks, displays, shelves, point-of-sale registers, shopping carts, etc. In some embodiments, the trigger module 316 presents slides in response to pre-sale triggers, such as when a user enters a retail store, post-sale triggers, such as after a user purchases items, and "cart abandonment" triggers, such as when a user exits a retail store without making a purchase. In such an embodiment, the slides presented by the trigger module 316 may include offers, promotions, coupons, or the like to incentivize the user to make a purchase in the store at the present time and/or at a different period of time.

In various embodiments, the trigger module 316 presents an interactive slide deck in response to a user interacting with a sponsor-related link, such as an advertisement, promotion, coupon, offer, or the like. In some embodiments, the trigger module 316 presents an interactive slide deck that is associated with the sponsor-related link. For example, the trigger module 316 may present a real-estate themed slide deck in response to a user interacting with an advertisement for a real estate listing. In certain embodiments, the trigger module 316, in response to a user interactive with a sponsor-related link, presents a specific slide of an interactive slide deck that is not necessarily the first slide of the slide deck. For example, the trigger module 316 may present a slide for a specific real estate listing that is located in the middle of a slide deck comprising a plurality of different real estate listings in response to a user clicking on an advertisement for the specific real estate listing. The trigger module 316 may present slides of various different types of slide decks, including, but not limited to, sales, product demonstrations, advertising, education, training, certification compliance, etc.

For example, the trigger module 316 may present an advertisement. In response to a user responding to the advertisement (e.g., clicking or otherwise interacting with the advertisement), the analytics module 306 may determine and store the user's IP address, and the trigger module 316 may present a "landing page," e.g., a slide within a slide deck associated with the advertisement, to the user based on the user's IP address. Moreover, the trigger module 316 may present various forms, such as opt-in forms, contact forms, or the like, in response to the user interacting with the advertisement. In response to the user filling-out and submitting the forms, the analytics module 306 may analyze and store data derived from the data in the forms, such as demographic data, psychographic data, and/or the like in order to provide more personalized data for affiliates, advertisers, sponsors, or other third-parties.

In yet another embodiment, the trigger module 316 presents the slides in response to receiving a signal from a beacon. As used herein, a beacon may include a hardware component that transmits messages to different information handling devices 102 over a wireless communication protocol, such as Bluetooth®. For example, retail stores may install beacons at various points in the store, such as entryways, such that when a shopper enters the store, a beacon sends a notification or message to the shopper's smart phone to inform them of items on sale, available brands, locations of items, or the like. As such, the trigger module 316 may receive the notification or message from the beacon and display an interactive slide presentation (e.g., a slide presentation associated with the store, items in the store, or the like). The rewards module 310 may also present one or more coupons, offers, promotions, or the like, to the user in response to the user going through the slide deck presented in response to the trigger module 316 receiving a message from the beacon.

In some embodiments, the trigger module 316 presents slides in response to the user entering an area delimited by a geo-fence. A geo-fence, as used herein, may comprise a virtual perimeter for a real-world geographic area. The virtual perimeter is established using location-based services, such as GPS. When a user enters a geo-fence, such as a virtual perimeter established in a retail store, the trigger module 316 may receive a message, from a beacon, for example, and present one or more slides associated with the area within the geo-fence. For example, a retail store may establish a geo-fence around different sections of the store, such as the electronics, clothing, food, etc. The trigger module 316 may present one or more slides associated with items for sale within the electronics section in response to the user walking into the geo-fence for the electronics section.

In one embodiment, the trigger module 316 presents one or more slides or slide decks in response to a device, sensor, beacon, or the like, that is in communication with the trigger module 316, sending a signal that it is malfunctioning, disabled, or otherwise broken. For example, the trigger module 316 may receive a signal that a smart refrigerator in communication with the trigger module 316 has a malfunctioning part. In response to receiving the signal from the malfunctioning refrigerator, the trigger module 316 may present one or more slides or slide decks that comprise information regarding the refrigerator, such as the model number of the refrigerator, the part numbers for the malfunctioning parts, a specification sheet, schematic diagrams, images of the part(s) that is malfunctioning, repair information (e.g., tutorials, videos, web pages, etc.), information regarding service centers within a proximity of the refrigerator (e.g., a map with different repair centers, phone numbers, addresses, reviews, ratings, etc.), or the like. The trigger module 316 may present a slide deck that comprises a step-by-step guide on how to repair the refrigerator that includes videos and other information, and what to do in the event of an emergency (e.g., who to call, how to get help, etc.).

The slides may also include interactive elements, such as links to retailers to purchase new parts or new refrigerators, which may include interactive advertisements, coupons, promotions, offers, etc. The interactive elements may also include questions and answers that assist a user in diagnosing the malfunction if the user cannot determine which part(s) are malfunctioning. The interactive elements may also include questions or forms that a user completes in order to receive bids from different repair centers, parts suppliers, or the like. The interactive slides may also connect a user to a service center via text, chat, instant message, or the like so that the user can get information and assistance in real-time.

In another example, a user may scan a QR code printed on an advertisement promoting a discount at a retail store, a hotel, a sporting event, an airport, or the like. In response to scanning the QR code, the trigger module 316 may send an interactive slide presentation, which may include surveys, videos, polls, quizzes, or the like, via a text message and/or email message to the information handling device 102. The user may then receive a promotional incentive in response to viewing the slides of the slide deck and providing responses to the interactive elements.

In another example, the trigger module 316 may receive an electronic message from a user. The electronic message may include a text message, an email message, a digital voice message, or the like. In one example, a store may post an advertisement stating, "Text COUPON to 55555 to get 15% off of your purchase." In response to the user texting the word "COUPON" to the specified number on their information handling device 102, the trigger module 316 sends a reply message. The reply message may include an interactive slide presentation. In another embodiment, the reply message includes a link to the interactive slide presentation hosted on a website. In order to receive the discount, the user may be required to go through each slide of the slide deck and perform some action associated with the interactive elements displayed on the slides, such as answer survey questions, fill-out a lead capture form, play a game, and/or the like. The user may then be sent a coupon via an electronic message to use in the store.

In another embodiment, the trigger module 316 activates a slide presentation in response to an event associated with the user. For example, in response to a sporting event, a received text/email, a weather update, a traffic alert, and/or the like, the trigger module 316 may activate presentation of an interactive slide deck without user input. After the user's favorite team scores, for example, the trigger module 316 may activate a presentation displaying slides of merchandise, promotions, advertisements, and/or the like associated with the user's favorite team.

In another embodiment, the trigger module 316 presents a slide presentation in an augmented realty software application in response to detecting an external trigger. In one embodiment, the external trigger includes detecting, by one or more sensors on the information handling device 102, a physical sign, a particular room, or items within a room, entering a store, and/or the like. The augmented reality application, such as a game, for example, may include an augmented reality environment, such that the application includes a view of a real-world environment with elements that are augmented by computer-generated sensory input, such as audio, video, graphics, GPS, or the like. For example, a user walking down a street may be viewing the extent of the street in front of them through an application running on a mobile device. The application may augment the street view on the mobile device by adding computer generated elements, such as ratings for various restaurants on the street, offers from various retail stores on the street, points of interest, or the like. The trigger module 316, in one embodiment, distributes interactive slides to the application running on the smart device to augment the view of the street. Thus, for example, in order to receive a discount at a store on the street, the user may need to go through the slide presentation associated with the store, which may include a questionnaire as an interactive element displayed on the slides. The coupon may then be sent via text, email, and/or the like, to the user in response to the user completing the questionnaire.

In one embodiment, the trigger module 316 presents interactive elements in response to audible or displayed text associated with a slide. For example, a slide may include an interactive video presenting an automobile advertisement. The advertisement may include a narrator that audibly describes the various features of the automobile while images or videos of the features are displayed along with displayed text. The trigger module 316 may take an action in response to cues from the narrator's spoken words or the displayed text. For example, the trigger module 316 may display webpages, images, surveys, quizzes, advertisements, games, and/or the like, in response to the words and/or text in the video. Thus, as the narrator describes the interior options on different models, for example, the trigger module 316 may present one or more interactive elements describing the different interior options in response to an audible or textual cue, such as the word "interior," as spoken by the narrator or presented on the video. These cues may also be used as keywords for SEO, notes for sales or learning, and/or the like.

In one embodiment, the upload module 318 receives one or more slides for presentation by the slide module 202. In certain embodiments, the upload module 318 receives slides that are uploaded by a user. For example, the upload module 318 may receive slides uploaded from a user's laptop over the data network. In certain embodiments, the upload module 318 stores the uploaded slides on the server 108 in a data store, such as a database, or the like. In another embodiment, the upload module 318 receives slides that are hosted on an external website, such as SlideShare®, Instagram®, Picasa®, and/or the like. The upload module 318, in such an embodiment, receives a link to the external site from the user, imports the specified content from the external site through the data network 106, and stores the content on the server 108. In one embodiment, individual slides are received by the upload module 318. For example, a user may upload a single PowerPoint® slide, an image, document, and/or the like. In another embodiment, the upload module 318 receives slides in bulk, e.g., an entire slide deck, such as slide presentations that contain more than a single slide prepared with slide presentation software, such as PowerPoint®, Keynote®, and/or the like, photos in an archived (e.g., .zip) file, a multiple page PDF file, and/or the like.

The creation module 320, in one embodiment, prepares one or more slides for presentation by the slide module 202. In some embodiments, the creation module 320 receives one or more slides from the upload module 318 such that a user may add different content and interactive elements to the uploaded slides and/or add new slides to the uploaded slides. In certain embodiments, the creation module 320 prepares a slide by adding interactive elements, multimedia content, and/or the like to the slide. In some embodiments, the creation module 320 provides an administration interface where a user creating an interactive slide deck can add predefined interactive elements onto a slide such as by dragging-and-dropping elements onto the slide, drawing elements on a slide, and/or the like. In such an embodiment, the user can specify how the interactive element appears, the action(s) associated with the interactive element, and/or the like. In another embodiment, a user inserts advertisements, marketing material, commercial videos, and/other slides into the slide deck. For example, a sponsor may pay to have their advertisements inserted into the interactive slide deck. These slides may also contain interactive elements, such as links to the sponsor's webpage, questionnaires provided by the sponsor, and/or the like.

For example, a user may drag a button onto the slide and place it in a specific location. After the button is placed, the user may specify that a survey question should be displayed when a user clicks on the button. The user may then create the survey question and the possible responses. In one embodiment, the creation module 320 receives a slide presentation order from the user specifying the order the slides should be presented by the slide module 202. In certain embodiments, the user defines which slide should be displayed by the slide module 202 in response to a user answering a survey question, quiz question, poll question, and/or the like. In one embodiment, the branching module 302 uses this information to link to different slides in the slide deck based on a user's interaction with the interactive elements.

In one embodiment, the slides received by the upload module 318 serve as the foundations, as backgrounds, as starting points, etc. for creating and/or editing different slides. For example, the upload module 318 may receive one or more images or slides, and the user may add different content (e.g., multimedia content) and/or interactive elements to the uploaded images or slides. In this manner, the creation module 320 may repurpose existing images or slides in response to the user editing existing images or slides by adding or removing existing content and/or creating new slides based on the existing images or slides, in addition to creating new slides from scratch.

The creation module 320, in one embodiment, maintains one or more predefined slide decks, similar to templates described below, for generating a story board. For example, the slide decks may be pre-formatted with content such as text and images for various applications, such as campaigns, projects, multi-media, speeches, notes etc. In a further embodiment, the creation module prompt a user for input, either via audio prompts or graphical prompts, related to the slides that the user is creating. For example, the creation module 320 may present a prompt such as "What is your topic?," "What is the title?," "What is your headline?," "What is your introduction," etc. The creation module 320, may receive the user's responses via audio input, text input, or the like, and may insert the input into the slides.

In some embodiments, the creation module 320 creates one or more template slides or slide decks from predesigned slides. As used herein, a template slide or slide deck may comprise slides that have already been designed, e.g., the slides may contain various content and/or interactive elements, and can act as the base for new slide decks. For example, different real-estate slide decks may be derived from a real-estate slide deck template that contains different hyperlinks, titles, text content, images, etc. The creation module 320 may maintain a library of slide deck templates for various contexts, such as executive summaries, pitch decks, marketing presentations, advertising presentations, education, training, compliance, certifications, or the like.

In certain embodiments, users may add interactive elements to their own slides as a free service or as a paid service, based on a global license and fee structure, and based on certain criteria, such as users, presentations, and/or the like. For example, eBay® may pay a monthly fee to add interactive content elements to their slide decks; however, the license may be limited to a certain number of presentations, users, and/or the like. In some embodiments, the paid service provides an expanded set of options for interactive elements. For example, a free service may only provide survey questions whereas the paid service may provide survey questions, poll questions, interactive video, and/or the like.

In one embodiment, the creation module 320 assigns permissions to an interactive slide deck that allow users with the same, or higher, permissions as the slide deck to edit the slide deck. For example, a salesperson may create an interactive slide deck and assign a permission level to the slide deck such that only sales persons who have the same, or higher, permission level may edit the slide deck. In some embodiments, an authorized user may modify the content of the slide, modify the interactive elements (including type and content), modify the order of the slide deck, and/or the like. In certain embodiments, the creation module assigns different permissions to different slides of an interactive slide deck.

For example, the creation module 320, for a slide deck that has ten slides, may assign a "confidential" permission level to five slides of the slide deck and a "top-secret" permission level to the other five slides of the slide deck. In certain embodiments, the creation module 320 assigns a log-in to one or more slides or an entire slide deck such that a user needs to provide credentials, such as a user name, password, or the like in order to access the slides. Other forms of providing credentials may be used in any combinations, such as retina scans, finger prints, passwords, digital certificates, and/or the like.

In another embodiment, the creation module 320 generates an interactive slide deck based on input received from a plurality of users collaborating together on the slide deck. In such an embodiment, the slide deck being created is hosted in the cloud such that multiple users may access and edit the slide deck regardless their location. For example, the sales persons comprising the sales department in a company may be located in different locations. The sales persons, however, may work together to collaborate and create an interactive slide deck.

In certain embodiments, the creation module 320 converts an interactive slide deck into an interactive video. For example, an interactive slide deck that includes a plurality of interactive slides may be converted into an interactive video by removing the transitions between the slides. Instead of transitioning from one slide to another based on user input, a converted slide deck video may be paused at a transition point in order to wait for the user to respond to the interactive elements. After the user responds to an interactive survey question, for example, the video may continue playback of the video slideshow until the user is prompted to provide input again. In such an embodiment, the branching module 302 links to different video clips representing the converted slides based on a user's responses to the interactive elements. In another embodiment, a user may jump back and forth between different video clips. For example, the video may present a menu, list, and/or the like of the different video clips that comprise the video, which the user may interact with to select a specific clip.

In accordance with the subject matter disclosed herein, a user may, for example, take picture(s) on his smart phone, upload the picture(s), create and position interactive elements over the images, order the images, and produce an interactive slideshow all from their mobile device. In one embodiment, the user may use a mobile application, such as Google Goggles®, to capture an image and integrate information from the Internet based on the image. The user may then share the interactive slideshow on their social network, collect real-time usage data from their users, and/or the like, in order to market their products, produce an advertising campaign, generate sales and leads, provide interactive training materials, and/or the like.

In another example, an interactive slide deck may comprise a brochure. In one embodiment, a brochure is created by a business to market and/or advertise its products and/or services. For example, the business may put a slide deck together that includes images, videos, audio tracks, and/or the like, displaying its products and/or services. The brochure may also include interactive elements, such as question and answer elements to receive feedback, comments, rankings, and/or the like associated with the products/services displayed on the slides. The business may then share their interactive brochure with potential customers, investors, and/or the like. In some embodiments, the creation module 320 adds customized slides to a brochure associated with value-added retailers ("VAR") of the business. For example, a VAR associated with a software company may add VAR-specific customized slides to the front-end of the slide deck and the back-end of the slide deck, which helps the VAR collect information for leads, contacts, and/or the like.

Figure 4:
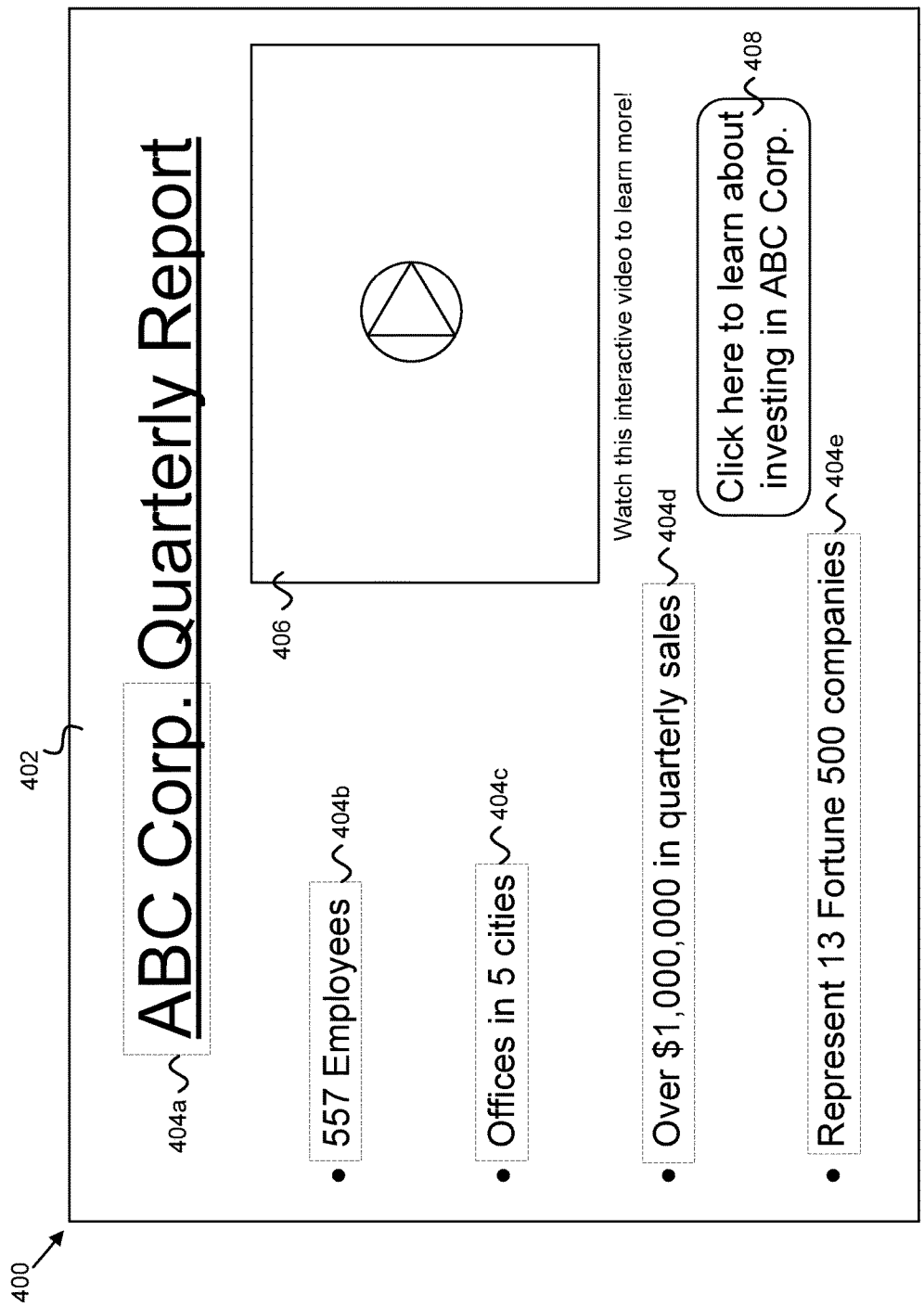
FIG. 4 illustrates an example embodiment of a slide presentation comprising interactive elements.

FIG. 4 depicts one embodiment of a slide 402 incorporating interactive content. In the depicted embodiment, an uploaded slide 402 for a quarterly report presentation, for example, is presented by the slide module 202. The uploaded slide 402 may be a static slide that does not have any embedded interactive elements. The overlay module 204, in one embodiment, displays interactive elements 404*a*-*e*, 406, 408, over the slide 402. For example, certain interactive elements 404*a*-*e* may include hyperlinks and/or hotspots that overlay text such that when the text is interacted with, certain actions are performed. Some actions may include displaying a website, playing a video in a pop up, displaying a tool tip, and/or the like. Additional actions may include presenting a survey, quiz, poll, game, assessment, review, and/or the like.

The interactive elements 404*a*-*e*, 406, 408 may also include a video 406 that is playable on the slide. In certain embodiments, the video 406 may also incorporate interactive elements. Thus, during playback of the video, the user may be presented with a survey, quiz, poll, or the like, which the user may be required to respond to in order to continue playback of the video. A button 408 may also be displayed that presents a new slide when interacted with by the user. The branching module 302 may determine which slide should be presented next by the slide module 202 if the button 408 includes a link to a different slide in the slide deck. For example, if the depicted slide 402 is slide 1 in the deck, instead of moving sequentially to slide 2 when the user clicks the button 408, the button 408 may specify that slide 5 should be presented next. The branching module 302 may then link to slide 5, which would then be presented by the slide module 202.

In some embodiments, the analytics module 304 tracks the users' activity while on the slide 402 and collects data in real-time, including responses to questions, interaction behavior (e.g., if the user watches the full video 406, when the user stops the video 406, whether the user clicks on a link 404*a*-*e*, and/or the like), how long the user stays on the slide 402 before going to a new slide, and/or the like. In another embodiment, a social module 312 may share this slide 402, or the entire slide deck, in response to user input. The user may specify where to share the slide 402 (i.e., which social network(s) to share the slide 402 on), who to share the slide 402 with, how to share the slide 402, and/or the like. For example, the user may choose to post the slide 402 to his Twitter® feed and email the entire slide deck to his friend.

Figure 5:
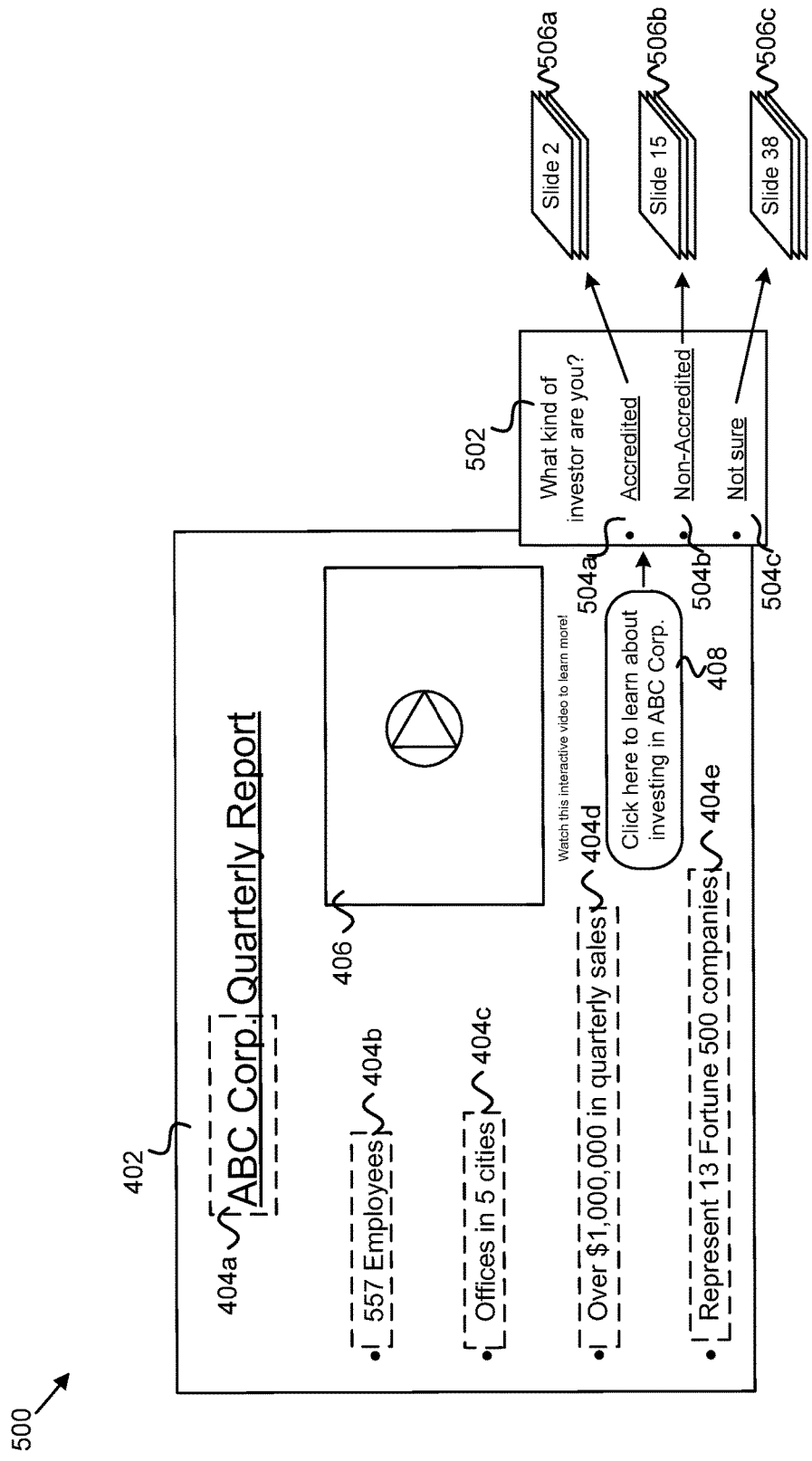
FIG. 5 illustrates an example embodiment of another slide presentation comprising interactive elements.

FIG. 5 depicts another slide 402 presented by the slide module 202 that is substantially similar to the slide 402 depicted in FIG. 4. The slide 402 includes one or more interactive elements positioned over the slide by the overlay module 204, such as links/hot spots 404*a*-*e*, a video 406, and a button 408. In one embodiment, a survey question 502 is presented in response to the interactive module 206 receiving input from the user. The survey question 502, for in the depicted embodiment, presents a question to determine the type of investor the user is, "Accredited" 504*a*, "Non-Accredited" 504*b*, or "Not Sure" 504*c*.

The interactive module 206 may receive a user's response to the survey question 502 and the branching module 302 may determine which slide should be displayed next based on the user's response. Thus, if a user selects "Accredited" 504*a* in response to the survey question 502, the branching module 302 may present slide 2 506*a* next. In some embodiments, the branching module 302 notifies the slide module 202 that slide 2 506*a* should be displayed next. Similarly, if the user selects "Non-Accredited" 504*b* or "Not Sure" 504*c* in response to the survey question 502, the branching module 302 confirms slide 15 506*b* or slide 38 506*c*, respectively, is presented next. In some embodiments, the slide module 202 does not present a new slide until the user has responded to the survey question 502. Thus, the user cannot advance through the slide deck unless and until he provides responses to certain interactive elements.

Figure 6:
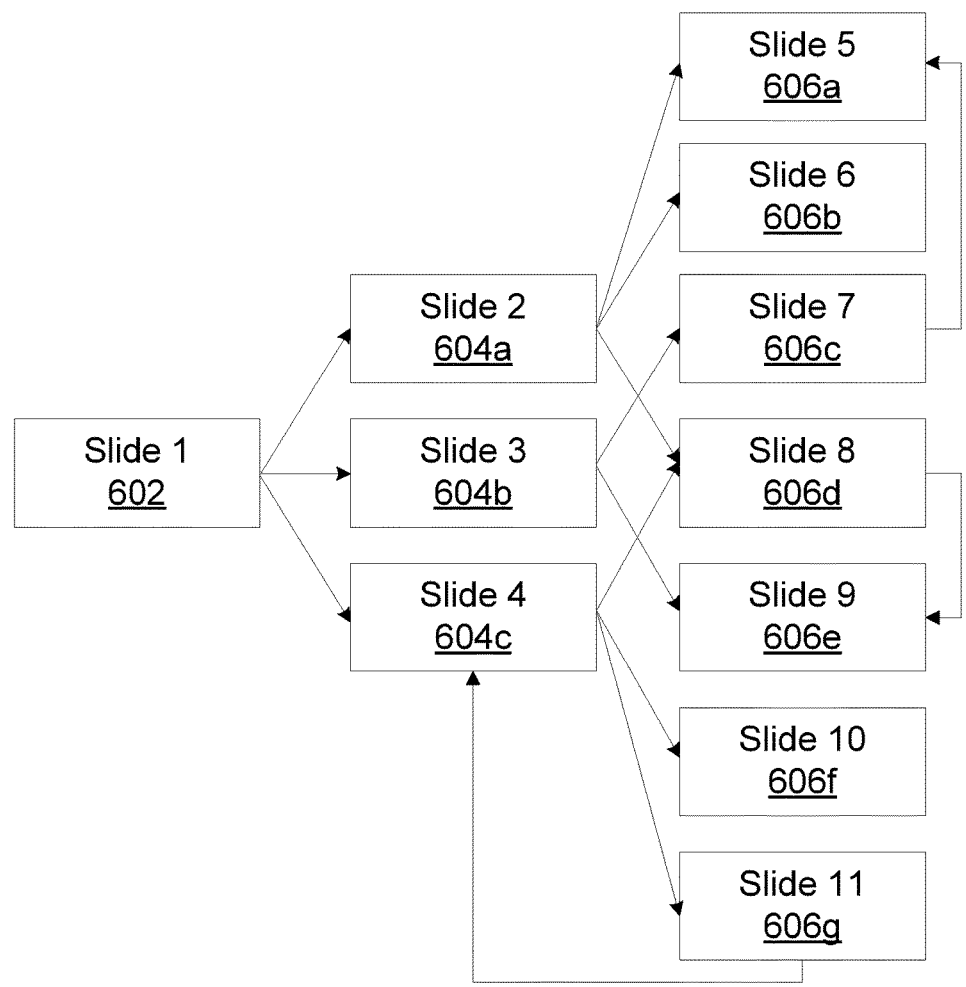
FIG. 6 illustrates an example embodiment of linking slides based on input received by the interactive elements.

FIG. 6 illustrates one example embodiment of slide branching within a slide deck, which may be performed by the branching module 302. In the depicted embodiment, a slide deck is presented with 11 slides. Slide 1 602, the first slide presented by the slide module 202, may include interactive elements displayed by the overlay module 204 that link slide 1 602 to slides 2-4 640*a*-*c* depending on the user input received by the interactive module 206. Slide 2 604*a* may include interactive elements that link the slide 604*a* to slide 5 606*a*, slide 6 606*b*, and slide 8 606*d*. Slide 3 604*b* may include interactive elements that link the slide 604*b* to slide 7 606*c* and slide 9 606*e*. And slide 4 604*c* may include interactive elements that link the slide 604*c* to slide 8 606*d*, slide 10 606*f*, and slide 11 606*g*.

Further, slide 7 606*c* may include interactive elements that link the slide 606*c* to slide 5 606*a*; slide 8 606*d* may include interactive elements that link the slide 606*d* to slide 9 606*e*; and slide 11 606*g* may include interactive elements that link slide 11 606*g* to slide 4 604*c*. Thus, unlike traditional slideshow presentations, the interactive elements added to a slide by the overlay module 204 provides a non-sequential path through the slide deck. In this manner, a slideshow creator can customize a user's experience as the user progresses through a slideshow based on the user's responses to interactive elements, such as surveys, quizzes, polls, and/or the like.

Figure 7:
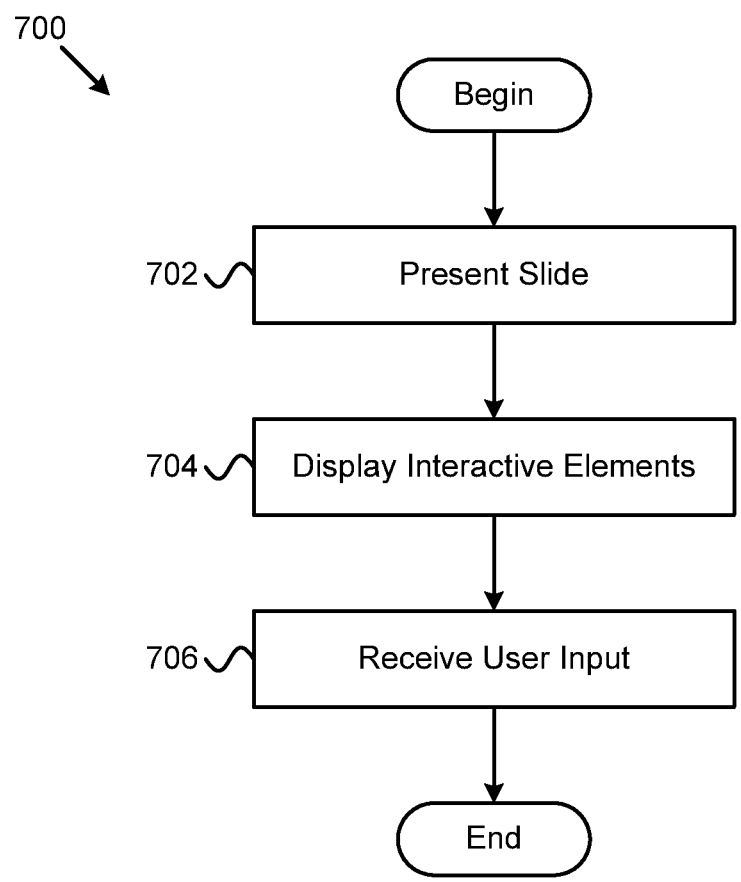
FIG. 7 is a schematic flow chart diagram illustrating one embodiment of a N method for adding interactivity to slide presentations.

FIG. 7 depicts one embodiment of a method 700 for adding interactivity to slide presentations. In the depicted embodiment, the method 700 begins and a slide module 202 presents 702 a slide to a user. The slide module 202, in certain embodiments, presents 702 the slide to the user using an application configured to display interactive slides, such as a web browser, a smart phone application, and/or the like. In certain embodiments, the slide module 202 stores the slides on a server 108, which is accessible to a user's information handling device 102 over the data network 106.

In a further embodiment, an overlay module 204 displays 704 interactive elements over the slide presented 702 by the slide module 202. The interactive elements displayed 704 by the overlay module 204 may include graphical interface elements, such as hyperlinks, buttons, media players, hotspots, tool tips, pop-ups, and/or the like. In another embodiment, the interactive elements may also include question and answer elements, such as survey questions, quiz questions, poll questions, and/or the like.

In one embodiment, an interactive module 206 receives 706 user input associated with interactive elements displayed by the overlay module 204. The interactive module 206, for example, may receive 706 input from a user in response to a survey question. Input may be received 706 by the interactive module 206 via various input devices and means, such as a keyboard, mouse, stylus, touch, gesture, and/or the like. The interactive module 206, in some embodiments, notifies other modules that input has been received, such as the branching module 302, the analytics module 306, and/or the like. In one embodiment, in response to the user input received 706 by the interactive module 206, the interactive elements may perform an associated action, such as displaying a webpage, playing a video, presenting a question and answer display (e.g., a survey question, quiz question, or the like), presenting a new slide, and/or the like, and the method 700 ends.

Figure 8:
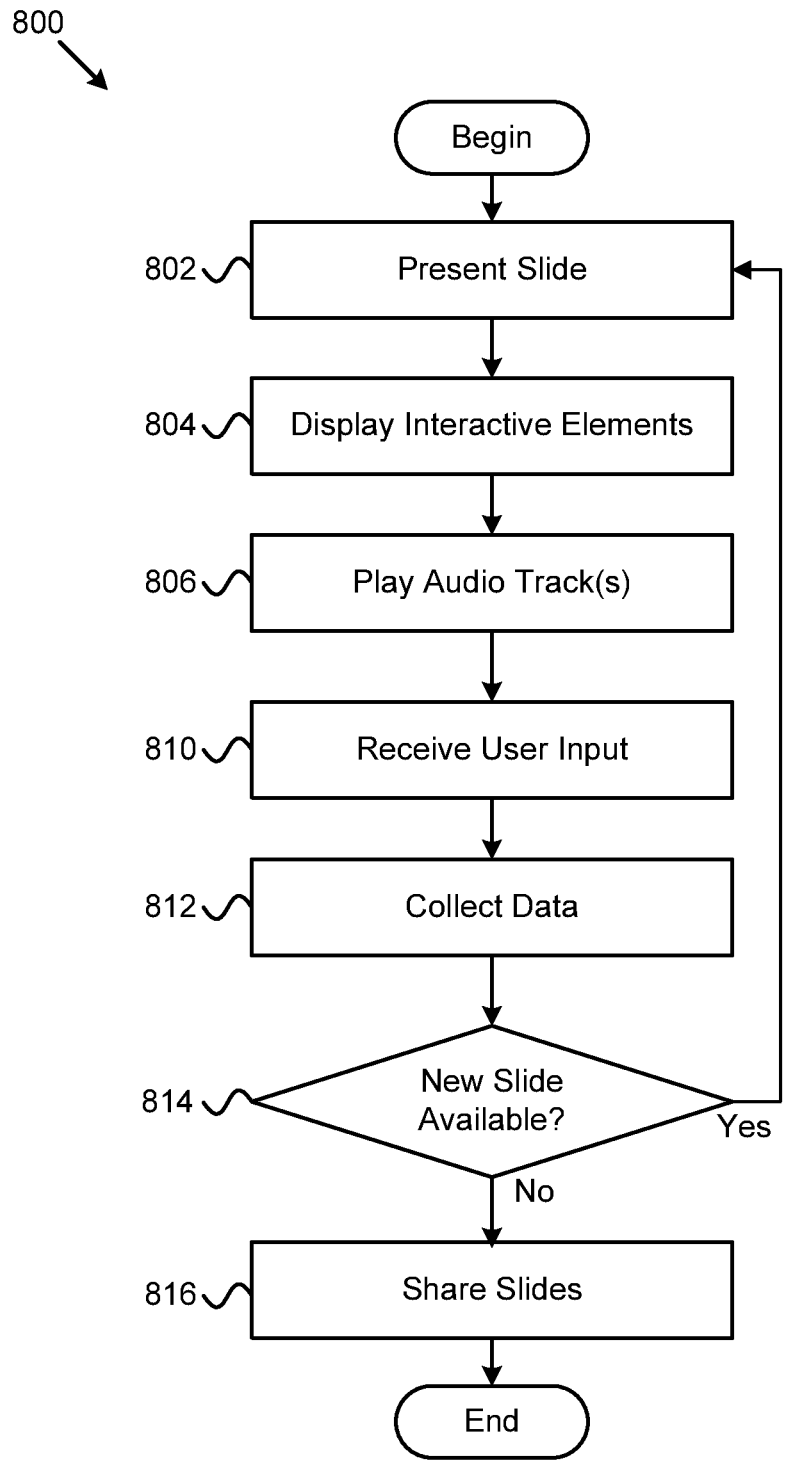
FIG. 8 is a schematic flow chart diagram illustrating one embodiment of another method for adding interactivity to slide presentations.

FIG. 8 depicts one embodiment of another method 800 for adding interactivity to slide presentations. The method 800 begins, in one embodiment, and a slide module 202 presents 802 a slide to a user. An overlay module 204, in another embodiment, displays 804 one or more interactive elements over the slide presented 802 by the slide module 202. In yet a further embodiment, an audio module 304 plays 806 one or more audio tracks while the slide in presented 802. In some embodiments, the audio module 304 plays 806 an audio track when the slide is first presented 802 to the user. In certain embodiments, the audio module 304 plays 806 an audio track in response to a user interacting with an interactive element associated with an audio track. The audio track, in one embodiment, includes voice recordings, music recordings, and/or the like.

In a further embodiment, an interactive module 206 receives 810 user input associated with an interactive element. An analytics module 306, in one embodiment, collects 812 data associated with the user input received 810 by the interactive module 206. The data may include responses to questions, behavioral data associated with the user's activity on the slide (e.g., how long the user stayed on the slide, the user's cursor movement on the slide, how long a user watched a video presented on the slide, and/or the like). In some embodiments, a data module 308 integrates the data collected by the analytics module 306 with third-party information systems, such as CRM systems, CMS systems, business intelligence systems, e-commerce systems, and/or the like.

In one embodiment, the slide module 202 and/or the branching module 302 determines 814 whether a new slide is available based on user input received from the interactive module 206. If the slide module 202 and/or the branching module 302 determines 814 a new slide is available, the slide module 202 presents 802 the new slide. In some embodiments, the branching module 302 notifies the slide module 202 that a new slide should be presented. If the slide module 202 and/or branching module 302 determines 814 that there is not a new slide available, a social module 314 shares 816 the slides.

In one embodiment, the social module 314 shares 816 the slides in response to the user selecting a social network to post the slides to, such as Facebook®, Twitter®, and/or the like. In another embodiment, the social module 314 shares 816 the slides by email, text, and/or the like as specified by the user. For example, a user may specify one or more email addresses for the social module 314 to send the slides to. Alternatively, the social module 314 may send a link to the slides that are hosted on a server 108 or on a social network associated with the user. In some embodiments, the social module 314 shares 816 individual slides. For example, before the slide module 302 determines 814 whether to present a new slide, the user may choose to share 816 a currently presented slide, and the method 800 ends.

Figure 9:
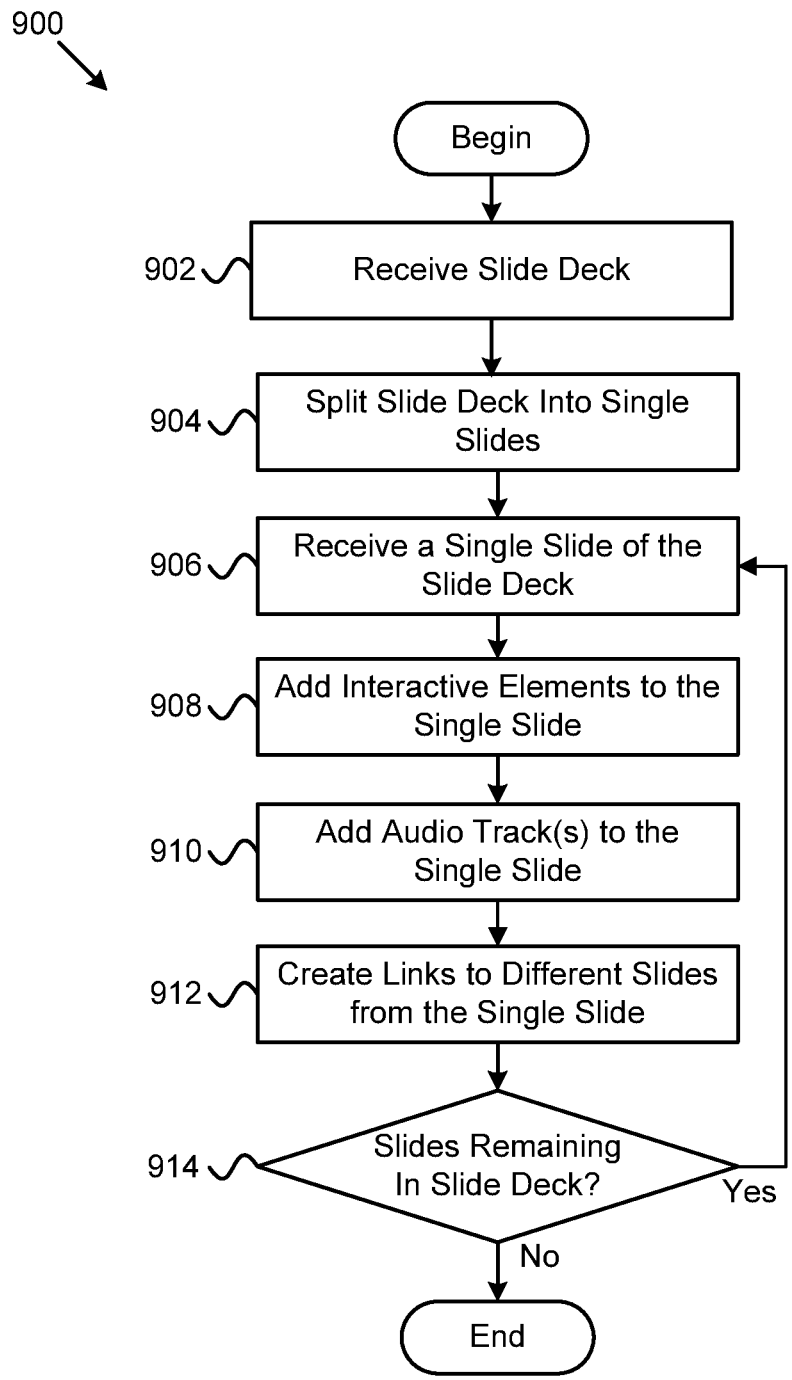
FIG. 9 is a schematic flow chart diagram illustrating one embodiment of a further method for adding interactivity to slide presentations.

FIG. 9 depicts one embodiment of a yet another method 900 for adding interactivity to slide presentations. In one embodiment, the method 900 begins and an upload module 318 receives 902 a slide deck that includes a plurality of slides. In one embodiment, a user uploads a slide deck, such as a PowerPoint® presentation, or the like. In another embodiment, the upload module 318 receives 902 a slide deck hosted on an external server, such as a slide hosting site like SlideShare®, or the like. The upload module 318, in one embodiment, splits 904 the slide deck into individual slides.

The overlay module 204, in certain embodiments, receives 906 a single slide of the slide deck and adds 908 interactive content to the slide based on user input. For example, a user may drag-and-drop interactive elements on the slide, such as buttons, videos, question and answer elements (e.g., survey questions, quizzes, and/or the like), hyperlinks, or the like. In some embodiments, an audio module 304 adds 910 one or more audio tracks to the slide in response to user input. A user, for example, may associate an audio track with a slide, an interactive element, and/or the like. The audio module 304, in another embodiment, customizes the audio track in response to user input. For example, the user may specify when to start playing the track, the portions of the track to be played, how long to pay the track, and/or the like.

In a further embodiment, a branching module 302 creates 912 links from an interactive element to a new slide. For example, the branching module 302 may create 912 a link from slide 1 to slide 14 based on a user's response to a survey question. The branching module 302, in some embodiments, creates 912 links to new slides based on user input. Thus, a user may specify how the slide deck is navigated by other users based on the other users' responses to the interactive elements. The overlay module 204, in certain embodiments, determines 914 whether there are more individual slides remaining in the slide deck. If the overlay module 204 determines 914 that there are additional slides available, the overlay module 204 receives 906 the next slide. If the overlay module 204 determines 914 that there are not any more available slides in the slide deck, the method 900 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   detect an external cue using one or more sensors of a user's electronic device;
   activate, free of user input, display of a slide presentation that is associated with the external cue on the user's device in response to the external cue;
   present a first slide of the slide presentation associated with the external cue on the user's electronic device, the first slide being one of a plurality of slides comprising a slide deck of the slide presentation;
   determine one or more interactive elements to display over the presented first slide based on content presented on the presented first slide, the one or more interactive elements comprising one or more of textual and multimedia prompts for eliciting a response associated with the content presented on the presented first slide;
   dynamically determine one or more locations on the presented first slide for displaying the one or more interactive elements over the presented first slide, the one or more locations determined based on the content presented on the presented first slide;

display the one or more interactive elements over the presented first slide at the determined one or more locations;

display one or more possible responses to the one or more prompts, each of the one or more possible responses linked to a second slide of the slide presentation;

receive input in response to the user selecting a possible response to a displayed prompt; and present the second slide that is linked to the selected response in response to the received input.

2. The apparatus of claim 1, wherein the code is further executable by the processor to associate the link to the second slide of the plurality of slides with the interactive element.

3. The apparatus of claim 1, wherein the triggering event comprises receiving input from an external device, the external device comprising a beacon.

4. The apparatus of claim 1, wherein the triggering event comprises receiving input using one or more sensors, the sensors comprising one or more of audio input sensors, proximity sensors, motion sensors, and biological sensors.

5. The apparatus of claim 1, wherein the code is further executable by the processor to collect input data in response to the received input.

6. The apparatus of claim 5, wherein the code is further executable by the processor to integrate the collected input data with third-party applications, the third-party applications comprising one or more information management systems.

7. The apparatus of claim 1, wherein the code is further executable by the processor to play one or more audio tracks associated with the presented slide.

8. The apparatus of claim 1, wherein the code is further executable by the processor to present one or more slides of the slide deck on one or more social networks associated with a user.

9. The apparatus of claim 1, wherein the one or more interactive elements comprise questions, hot spots, buttons, and hyperlinks.

10. The apparatus of claim 1, wherein the presented slide comprises one or more multimedia elements, the one or more multimedia elements comprising one or more of videos, audio tracks, and images.

11. The apparatus of claim 1, wherein the code is further configured to receive a ranking score for the presented slide, wherein each slide of the slide deck is assigned a ranking score based on user input.

12. The apparatus of claim 1, wherein the code is further configured to associate the one or more interactive elements with the first slide in response to user input, the overlay module displaying on the first slide the one or more interactive elements associated with the first slide.

13. The apparatus of claim 1, wherein the code is further configured to provide a reward to a user in response to the user performing a rewards-based action associated with the first slide.

14. A method comprising:

detecting an external cue using one or more sensors of a user's electronic device;

activating, free of user input, display of a slide presentation that is associated with the external cue on the user's device in response to the external cue;

presenting a first slide of the slide presentation associated with the external cue on the user's electronic device, the first slide being one of a plurality of slides comprising a slide deck of the slide presentation;

determining one or more interactive elements to display over the presented first slide based on content presented on the presented first slide, the one or more interactive elements comprising one or more of textual and multimedia prompts for eliciting a response associated with the content presented on the presented first slide;

dynamically determining one or more locations on the presented first slide for displaying the one or more interactive elements over the presented first slide, the one or more locations determined based on the content presented on the presented first slide;

displaying the one or more interactive elements over the presented first slide at the determined one or more locations;

displaying one or more possible responses to the one or more prompts, each of the one or more possible responses linked to a second slide of the slide presentation;

receiving input in response to the user selecting a possible response to a displayed prompt; and presenting the second slide that is linked to the selected response in response to the received input.

15. The method of claim 14, further comprising associating the link to the second slide of the plurality of slides with the interactive element, wherein the second slide is presented in response to the received input.

16. The method of claim 14, wherein the triggering event comprises receiving input from an external device, the external device comprising a beacon.

17. The method of claim 14, wherein the triggering event comprises receiving input using one or more sensors, the sensors comprising one or more of audio input sensors, proximity sensors, motion sensors, and biological sensors.

18. A program product comprising a non-transitory computer readable storage medium that stores code executable by a processor, the executable code comprising code to perform:

detecting an external cue using one or more sensors of a user's electronic device;

activating, free of user input, display of a slide presentation that is associated with the external cue on the user's device in response to the external cue;

presenting a first slide of the slide presentation associated with the external cue on the user's electronic device, the first slide being one of a plurality of slides comprising a slide deck of the slide presentation;

determining one or more interactive elements to display over the presented first slide based on content presented on the presented first slide, the one or more interactive elements comprising one or more of textual and multimedia prompts for eliciting a response associated with the content presented on the presented first slide;

dynamically determining one or more locations on the presented first slide for displaying the one or more interactive elements over the presented first slide, the one or more locations determined based on the content presented on the presented first slide;

displaying the one or more interactive elements over the presented first slide at the determined one or more locations;

displaying one or more possible responses to the one or more prompts, each of the one or more possible responses linked to a second slide of the slide presentation;

receiving input in response to the user selecting a possible response to a displayed prompt; and presenting the second slide that is linked to the selected response in response to the received input.

* * * * *